US005203840A

United States Patent [19]

Graf et al.

[11] Patent Number: 5,203,840

[45] Date of Patent: Apr. 20, 1993

[54] FLUID DISPENSING APPARATUS

[75] Inventors: Lothar Graf, Rielasingen/Worblingen; Peter Pfeiffer, Gaienhofen; Ernst Buhr, Radolfzell, all of Fed. Rep. of Germany

[73] Assignee: Ing. Erich Pfeiffer GmbH & Co. KG, Fed. Rep. of Germany

[21] Appl. No.: 656,765

[22] Filed: Feb. 15, 1991

[30] Foreign Application Priority Data

Feb. 22, 1990 [DE] Fed. Rep. of Germany ....... 4005529

[51] Int. Cl.[5] ............................................ G01F 11/00

[52] U.S. Cl. .................................... 222/321; 239/490

[58] Field of Search ............... 222/321, 383, 385, 341, 222/402.1, 402.2, 402.13; 417/550, 552; 239/333, 490

[56] References Cited

U.S. PATENT DOCUMENTS

| | | | |
|---|---|---|---|
| 4,189,064 | 2/1980 | O'Neill et al. | 222/321 |
| 4,193,514 | 3/1980 | Langstroth | 222/153 |
| 4,203,534 | 5/1980 | Finke | 222/402.13 |
| 4,252,507 | 2/1981 | Knickerbocker | 417/550 |
| 4,503,996 | 3/1985 | Sorm et al. | 222/385 |
| 4,669,639 | 6/1987 | Klarenbach et al. | 222/396 |
| 4,762,475 | 8/1988 | Fuchs | 222/383 |
| 4,801,093 | 1/1989 | Brunet et al. | 239/490 |
| 4,830,284 | 5/1989 | Maerte | 222/321 |
| 4,934,568 | 6/1990 | Fuchs | 222/321 X |

FOREIGN PATENT DOCUMENTS

| | | | |
|---|---|---|---|
| 228188 | 5/1960 | Australia | 222/570 |
| 3525449 | 1/1987 | Fed. Rep. of Germany . | |
| 3544985 | 6/1987 | Fed. Rep. of Germany | 222/321 |
| 3722469 | 1/1989 | Fed. Rep. of Germany . | |
| 2042630 | 9/1980 | United Kingdom | 417/552 |

*Primary Examiner*—Andres Kashnikow
*Assistant Examiner*—Philippe Derakshani
*Attorney, Agent, or Firm*—Quarles & Brady

[57] ABSTRACT

Within the inner sleeve (7) of a discharge connection (5), a discharge head (1) receives approximately over its entire length the shaft (13) of an inner body (12) in such a way that the latter in the vicinity of the end of the inner sleeve (7) forms a connecting member (16) separate therefrom and located freely within a main body (2) serving as a plugging member for connection to a discharge apparatus.

26 Claims, 1 Drawing Sheet

FLUID DISPENSING APPARATUS

DESCRIPTION

Figure 2:
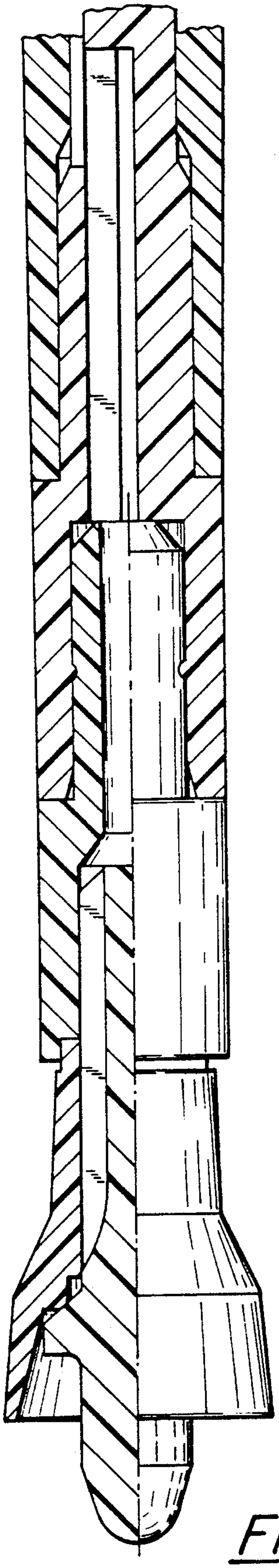

The invention relates to a discharge head or a discharge apparatus for flowable media and in particular liquids.

According to the invention said discharge head has a discharge opening or nozzle and a connecting member for connection to a counterpart, e.g. a valve tappet, a pump piston or the like of the discharge apparatus and is provided with an inserted inner body extending approximately into the vicinity of the discharge nozzle. Thus, a simple construction and high strength can be obtained.

The invention is based on the problem of removing the disadvantages of the known solutions and in particular creating a discharge head, in which the operating forces which occur can be reliably and directly transferred.

In order to solve this problem the inner body forms at least partly a direct connection to the counterpart, which it can contact or on which it is possibly supported in such a way that substantially the entire operating pressure can be transferred via the inner body to the counterpart and dead spaces can be reduced.

It is particularly advantageous if the connecting member is substantially formed by a component connected to the inner body and separate from the main body and is substantially freely located in the latter in such a way that it is not directly enveloped by the main body and instead has a radial spacing therefrom. However, against the operating pressure the connecting member or the inner body can be directly supported on the main body by at least one end or shoulder face.

Apart from the connecting member, the inner body can form with the other end a functional part of the discharge nozzle, in particular an inner nozzle core, which is engaged over in cap-like manner by a nozzle body having the nozzle opening. The nozzle body is appropriately constructed in one piece with the main body.

The inventive construction is particularly suitable for those discharge apparatuses, in which for forming an outlet valve the pump piston has an axially compressible piston collar, which surrounds a piston core forming a valve seat and is axially supported with respect to said piston core by its end remote from the piston. However, it is also conceivable to arrange on the connecting member a one-piece pump piston with a shaft or shank attachment or to construct the pump piston in one piece with the connecting member or to provide no valve. The inner body portion connected to the connecting member can define over part or all of its length an outlet channel located in the same and/or located on its outer circumference as a connection between the pump chamber or the outlet valve and the discharge nozzle. The outlet channel also traverses the connecting member or the pump piston.

In order that the inner body can easily be inserted, it has longitudinal portions with a different outside width, which appropriately decreases in stepped manner towards the discharge nozzle. The described construction also makes it possible to avoid a dead volume between the countermember of the discharge apparatus and the connected portion of the outlet channel and the directly connected channel portions of the countermember and the inner body appropriately have roughly the same flow cross-sections.

Advantageously the inner body is received in the main body with radial pressing and its tension is higher than the radial pressure of a maximum operating pressure in the discharge channel. If on a first part of its length the discharge channel is located entirely within the inner body and is on the outer circumference only on a following, mechanically more rigid longitudinal portion, said construction can be obtained in a relatively simple manner. As a result of this pressing effect, it is ensured that, although the discharge channel is bounded by two separate parts, it is not elastically widened or cannot spring leaks under the operating pressure.

These and further features of preferred developments of the invention can be gathered from the claims, description and drawings and the individual features can be realized in an embodiment of the invention and in other fields either singly or in the form of subcombinations and can represent advantageous, independently protectable constructions, for which protection is hereby claimed.

Figure 1:
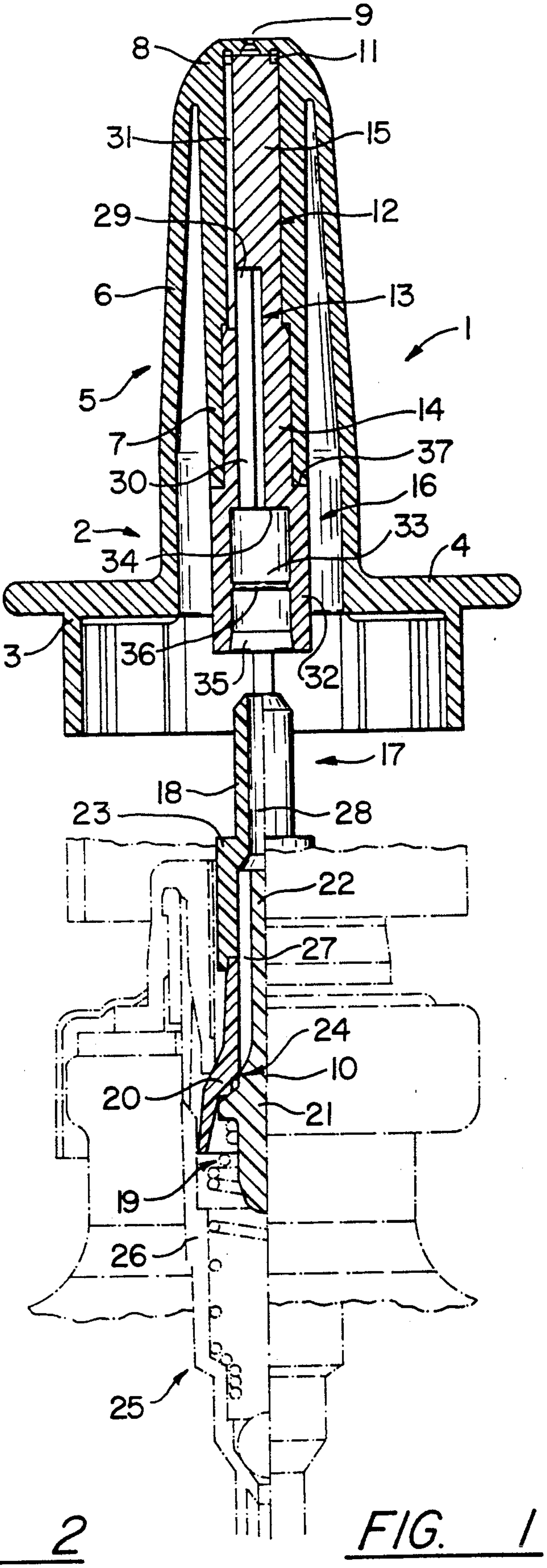

An embodiment of the invention is described in greater detail hereinafter relative to the drawings, wherein show:

FIG. 1 An axial section and a partly exploded view of a discharge head.

FIG. 2 A detail of the discharge head according to FIG. 1 on a larger scale and in composite form.

The discharge head 1 essentially only comprising two components has a main body 2, which forms at one end a cap 3 and with its end wall a handle 4 and over whose other face projects a connection 5. The latter is substantially formed by an outer sleeve 6 connected directly to the handle and an inner sleeve 7 located substantially in contact-free manner therein and which passes in one piece into the outer sleeve 6 by its end remote from the cap 3. In the transition region joining the outer sleeve 6 and inner sleeve 7 the connection 5 forms a one-piece nozzle cap 8 with the nozzle bore 9 located in the end wall and with which is directly associated on the inside of said end wall a whirl or twisting device 11. All the components are essentially located in a central axis 10.

A substantially rod or shank-like inner body 12 is inserted merely through the sliding in of its shaft 13, which essentially has smooth outer faces, in the inner sleeve 7 of the main body 2. The shaft 13 forms a cylindrical shaft portion 14 connected to a connecting member 16 and which passes via a frustum-shaped shoulder, contact-free with respect to the inner sleeve 7, into a cylindrical, smaller diameter shaft portion 15, whose end face extends up to the inner face of the end wall of the nozzle cap 8 and can be provided with profiles for forming a whirl device 11. The connecting member 16 is completely free and follows directly onto the free end of the inner sleeve 7 over which it projects with its entire length and contact-free relative to the outer sleeve 6 and into the cap 3, but is set back with respect to the cap end.

The connecting member 16 serves as the sole component for the connection of the discharge head 1 to a discharge apparatus, which e.g. has a pump inserted in sealed manner into a container neck for sucking medium out of the container and for forcing out said medium through the nozzle 9 during each pump stroke. The counterpart 17 has a shaft part 18, adapted to the connecting member 16 and corresponding to the inside length thereof and whose outside width corresponds roughly to that of the shaft 13. At its end remote from the shaft part 18, the counterpart carries a pump piston 19, which is substantially formed by a piston collar 20 with a compressible neck and widened piston lip, as well as a piston core 21, which passes through the piston collar 20.

The piston core has a core shaft 22 directed against the connecting member 16 and has the same outside width as the shaft part 18. The piston core 21 could be constructed in one piece with the shaft part 18 or can form the same and therefore be directly inserted in the connecting member 16, the collar neck then being axially supported on the end of the connecting member 16. However, here the shaft part 18 is formed by an intermediate part 23, into whose widened socket part whose outside width corresponds to the connecting member 16 the core shaft 22 is inserted by plugging in so that the collar neck is supported at the end of said socket part. With the outer circumference of the piston core 21, the inner circumference of the piston collar 20 forms an outlet valve 24, which under a given pressure in the chamber of the pump 25 or by axial abutment of the piston lip and accompanied by compression of the collar neck opens into a channel portion 27, which is located between the outer circumference of the core shaft 22 and the inner circumference of the piston collar 20 or the intermediate part 23. The channel portion 27 is connected to a bore-like channel portion 28 within the shaft part 18.

The channel portions 27, 28 belong to an outlet channel 29 extending from the outlet valve 24 to the whirl device 11 or the nozzle 9. Following on to the channel portion 28, the shaft portion 14 forms a channel portion 30 located entirely within its outer circumference and emanating from the interior of the connecting member 16 and which adjacent to the transition portion between the shaft portions 14, 15 issues radially outwards into a channel portion 31, which is located between the outer circumference of the shaft portion 15 and the inner circumference of the inner sleeve 7. The channel portion 31 e.g. formed by a longitudinal groove in the shaft portion 15 and which has a much smaller passage cross-section than the channel portion 30, extends up to the whirl device 11. The shaft portions 14, 15 engage in bore portions, adapted thereto, of a correspondingly stepped bore of the inner sleeve 7.

The substantially cup-shaped connecting member 16 has a jacket or a collar 32, which has roughly the same outside width as the inner sleeve 7 and is connected approximately continuously to the same within the outer sleeve 6. The free end of the inner sleeve 7 is set back with respect to the associated end of the outer sleeve 6 or the end wall of the cap 3. The collar 32 bounds a substantially cylindrical plugging or pinning opening 33, from whose planar bottom emanates a channel portion 30 and on whose bottom the shaft part 18 engages in the inserted state, so that the channel portion 28 is connected directly to the channel portion 30. The plugging opening 33 has an acute angled, conically widened insertion end 35 for the shaft part 18 correspondingly tapered at the free end. Between the ends of the cylindrical portion and slightly nearer to the insertion end 35 than to the bottom 34, the plugging opening 33 has an at least slightly inwardly projecting, one-piece annular bead 36 or the like as a locking ring and seal for the shaft part 18, so that although the latter is easily inserted, it is securely held.

The bottom wall of the connecting member 16 forms an annular shoulder 37 for supporting on the end face of the inner sleeve 7. Correspondingly the socket part of the intermediate part 23 can have an annular shoulder for supporting on the end face of the connecting member 16. According to FIG. 2 said socket part, the collar 32 and the inner sleeve 7 form a common, continuous and substantially uninterrupted outer circumferential surface. During the pump stroke the connecting member 16 can be introduced into the pump 25 or its associated cylinder cover until the cap end wall abuts with its inner face. The connecting member 16 is significantly shorter than the shaft 13 and much longer than its outside width. The shaft portion 15 is longer than the shaft portion 14. The plugging opening 33 is located entirely outside the inner sleeve 7.

We claim:

1. A discharge head for media defining a preassembled constructional unit adapted for assembly with a preassembled discharge apparatus having a counterpart separate from said discharge head, comprising:

- at least one main body having at least one discharge opening;
- at least one connecting member for connecting said at least one main body to the counterpart of the discharge apparatus; and
- at least one inner body separate from and inserted in said at least one main body, said at least one inner body extending substantially into the vicinity of said discharge opening, wherein said at least one inner body is constructed for direct contacting transition into the counterpart of said preassembled discharge apparatus.

2. The discharge head according to claim 1, wherein said connecting member is at least partly located on said at least one inner body and is formed by a component separate from said main body.

3. The discharge head according to claim 1, wherein said connecting member partly forms a subassembly separate from said at least one main body and combined with said at least one inner body.

4. The discharge head according to claim 1, wherein said connecting member is constructed in one piece with said inner body.

5. The discharge head according to claim 1, wherein said connecting member is formed by an end portion of said at least one inner body, said at least one inner body being substantially rod shaped.

6. The discharge head according to claim 1, wherein said connecting member has a full length extension, said connecting member substantially freely projecting over said full length extension and over an entire circumference of said connecting member.

7. The discharge head according to claim 1, wherein said at least one inner body has a remaining section longitudinally connecting to said connecting member, said connecting member being widened compared with said remaining section of said at least one inner body.

8. The discharge head according to claim 1, wherein at least one outlet channel extends from said connecting member to said discharge opening, said at least one outlet channel cross-sectionally defining an inner channel circumference bounded by said at least one inner body over part of said channel circumference and substantially the entire length of said channel.

9. The discharge head according to claim 1, wherein said inner body provides at least one duct defined by an end boundary of a nozzle opening and a transverse channel, said at least one inner body having a front end forming said at least one duct.

10. The discharge head according to claim 1, wherein at least one axial stop is provided for limiting the travel of said counterpart, said at least one inner body having a rear end forming said at least one axial stop.

11. The discharge head according to claim 1, wherein said at least one outlet channel at least over a first part of a length of at least one outlet channel and in the vicinity of a front end of said outlet channel is formed by a depression in an outer circumference of said at least one inner body, said at least one outlet channel being bounded by said at least one inner body over an entire circumference, and at least on a second part of said length connecting to said connecting member.

12. The discharge head according to claim 1, wherein at least one of said inner body (12) following onto an associated one of said at least one connecting member (16), has at least two longitudinal portions (14, 15) with different outside width.

13. The discharge head according to claim 12, wherein a front shaft portion of said at least one inner body has a reduced outside width and is inserted in an opening of said at least one main body.

14. The discharge head according to claim 1, wherein said at least one inner body is rigidly fixed in a plugging opening of said at least one main body.

15. The discharge head according to claim 12, wherein in the vicinity of a transition between two of said at least two shaft portions of said at least one inner body, two portions of different cross section of an outlet channel connect.

16. The discharge head according to claim 1, wherein said connecting member has at least one of dimensions defined by a length extension smaller than half of an entire length extension of an associated one of said at least one inner body and by a largest width of said at least one inner body.

17. The discharge head according to claim 1, wherein at least adjacent an associated portion of said connecting member, a neck of said at least one main body receives an associated portion of said at least one inner body, said neck having substantially a same outside width as said connecting member, said connecting member passing via a transition shoulder into an adjacent shaft portion of said at least one inner body.

18. The discharge head according to claim 1, wherein said connecting member has a reception opening providing a plugging opening for the counterpart, said reception opening extending substantially over an entire length extension of said connecting member and having an annular bottom face penetrated by an end of an associated portion of an outlet channel connecting said plugging opening to said outlet.

19. The discharge head according to claim 1, wherein said connecting member has opening ends, one of said opening ends being formed at a base of said connection member and the other of said opening ends being formed within said connecting member adjacent an outer channel to said outlet end, said connection member having a reception opening for receiving the counterpart, said reception opening extending between said opening ends and having on an inner circumference a single annular bead located between and spaced from said opening ends.

20. The discharge head according to claim 1, wherein at least one said main body has at least one inner neck receiving said at least one inner body, said inner neck extending over an entire length and over an entire circumference of said inner body, said inner neck being surrounded by a longer outer sleeve spaced outwardly from said inner neck and at least over a part of said length and said circumference.

21. The discharge head according to claim 20, wherein said inner neck and said outer sleeve project freely from a front end of said at least one main body, said at least one inner neck ad said outer sleeve being constructed in one part.

22. The discharge head according to claim 1, wherein at least one of members defined by an operating handle and a cap is provided, said at least one main body having an end remote from said discharge opening, said end being constructed as at least one of said members.

23. The discharge head according to claim 22, wherein said connecting member extends into an interior space of said cap.

24. The discharge head according to claim 1, wherein said counterpart forms a component of a piston unit of a thrust piston pump, said counterpart having a piston tappet and forming a counterbody forming a piston collar and an intermediate sleeve forming said at least one counterpart.

25. The discharge head according to claim 24, wherein said counterbody has longitudinally connecting length sections and an end section, each defining a cross-sectional external width section, said counterbody forming said end portion reduced in said external width extension with respect to said external width extension of at least one of said length sections.

26. A discharge head for media comprising:

at least one main body having at least one discharge duct;

at least one connecting member for connecting said main body to a counterpart of a discharge apparatus and at least one inner body inserted in said main body, wherein said inner body is received in said main body with a pressing action providing a radial pressure of a maximum operating pressure in said discharge duct.

* * * * *